United States Patent
Van Dijkman et al.

(10) Patent No.: US 11,738,585 B2
(45) Date of Patent: Aug. 29, 2023

(54) METHOD FOR APPLYING AN IMAGE ONTO THE RECORDING MEDIUM AND CORRESPONDING PRINTING APPARATUS

(71) Applicant: Canon Production Printing Holding B.V., Venlo (NL)

(72) Inventors: Thomas F. Van Dijkman, Venlo (NL); Daniel H. Turkenburg, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 129 days.

(21) Appl. No.: 17/209,357

(22) Filed: Mar. 23, 2021

(65) Prior Publication Data

US 2021/0300100 A1    Sep. 30, 2021

(30) Foreign Application Priority Data

Mar. 31, 2020 (EP) .................................... 20167275

(51) Int. Cl.
| | | |
|---|---|---|
| *B41M 5/00* | (2006.01) | |
| *B41J 11/00* | (2006.01) | |
| *C09D 11/322* | (2014.01) | |
| *C09D 11/54* | (2014.01) | |

(52) U.S. Cl.
CPC ........ *B41M 5/0017* (2013.01); *B41J 11/0015* (2013.01); *C09D 11/322* (2013.01); *C09D 11/54* (2013.01); *B41M 5/0023* (2013.01); *B41M 5/0047* (2013.01)

(58) Field of Classification Search
CPC ............. B41J 11/0015; B41M 5/0011; B41M 5/0017; B41M 5/0047; C09D 11/54; C09D 11/106; B81B 2201/051
See application file for complete search history.

(56) References Cited

U.S. PATENT DOCUMENTS

| | | | |
|---|---|---|---|
| 8,158,728 B2 * | 4/2012 | DeSimone | B29C 59/005 525/530 |
| 2003/0035917 A1 * | 2/2003 | Hyman | B41M 5/36 524/106 |
| 2007/0254278 A1 * | 11/2007 | DeSimone | B82Y 40/00 428/305.5 |
| 2007/0275193 A1 * | 11/2007 | DeSimone | B81C 99/0085 427/532 |
| 2009/0130320 A1 * | 5/2009 | Kawakami | B41M 5/0017 428/32.18 |
| 2012/0301686 A1 * | 11/2012 | Smak | C09D 11/30 427/256 |

(Continued)

FOREIGN PATENT DOCUMENTS

| | | |
|---|---|---|
| EP | 2872338 A1 | 5/2015 |
| WO | WO 2014/010710 A1 | 1/2014 |

OTHER PUBLICATIONS

Search Report issued in European priority application 20167275, dated Sep. 11, 2020.

*Primary Examiner* — John Zimmermann
(74) *Attorney, Agent, or Firm* — Birch, Stewart, Kolasch & Birch, LLP

(57) ABSTRACT

The present invention relates to a method for applying an image onto the recording medium, the method including the step of applying a primer composition comprising a stoichiometric polyelectrolyte complex to a recording medium. The present invention further relates to a printing apparatus for carrying out said method.

8 Claims, 3 Drawing Sheets

(56) References Cited

U.S. PATENT DOCUMENTS

| | | | |
|---|---|---|---|
| 2013/0344310 A1* | 12/2013 | Wasserfallen | B05D 3/002 |
| | | | 427/372.2 |
| 2014/0011004 A1* | 1/2014 | Sotzing | B41M 3/006 |
| | | | 428/196 |
| 2015/0299948 A1* | 10/2015 | Pan | D06P 5/30 |
| | | | 524/591 |
| 2017/0174926 A1* | 6/2017 | Worbs | B41M 5/5245 |
| 2018/0030295 A1 | 2/2018 | Bruinsma et al. | |
| 2018/0088506 A1* | 3/2018 | Weinstein | B41M 5/0011 |
| 2019/0016909 A1* | 1/2019 | Phillip | C09D 11/033 |

\* cited by examiner

METHOD FOR APPLYING AN IMAGE ONTO THE RECORDING MEDIUM AND CORRESPONDING PRINTING APPARATUS

FIELD OF THE INVENTION

The present invention relates to a method for applying an image onto the recording medium. The present invention further relates to a printing apparatus.

BACKGROUND ART

For improving image quality in ink-jet printing, primer compositions have been used to improve the interaction between the recording medium and the inks. Primer compositions may be used in combination with many types of ink, such as aqueous ink. Examples of aqueous inks are latex inks. These inks may comprise latex particles and a colorant, such as a pigment. In addition, these inks may comprise one or more organic co-solvents.

Primer compositions normally contain compositions with acidic and/or electrophilic properties in order to destabilize pigment color particles. As a result, the behaviour of the pigment particles upon drying of the printed medium is optimized. Uncontrollable ink drop coalescence ('puddling') and color bleed is prevented, and the optical color density may be improved.

Polymers are also known to be applied in primer compositions. However, in general, fluid comprising polymers have a high viscosity, especially at higher polymer content. Fluids having a high viscosity are difficult to jet using an ink jet print head.

Polymers carrying an electric charge are used preferably over polymers not carrying an electrical charge. A disadvantage of using such polymers is that compositions comprising polymers generally dry slowly, which inhibits waterfastness of the prints.

It is therefore an objective of the present invention to provide a method for applying an image onto a recording medium, wherein the waterfastness of the prints after application of the ink is improved. It is a further object of the invention to provide a primer composition that can be jetted using an inkjet print head.

SUMMARY OF THE INVENTION

This object is achieved in a method for applying an image onto the recording medium, the method comprising the steps of:
 a. Applying an aqueous primer onto the recording medium, the aqueous primer comprising a stoichiometric polyelectrolyte complex;
 b. Applying an aqueous ink onto the recording medium provided with the primer.

Primer Composition

The primer according to the present invention is an aqueous (i.e. water-based) composition comprising a stoichiometric polyelectrolyte complex.

A polyelectrolyte is a polymer having repeating units bearing an electrolyte group. The polymer has thus an electrical charge. Polyelectrolytes may be anionic or cationic. Alternatively, polyelectrolytes may comprise both anionic and cationic groups.

In solid form, polyelectrolytes may form a complex with a suitable counterion. In aqueous environment, however, they complexes tend to dissociate. Polycations and polyanions can form a complex upon combining; a polyelectrolyte complex, also known as PEC.

Stoichiometric polyelectrolyte complexes are a special type of polyelectrolyte complexes. When the polycations and the polyanions are mixed in stoichiometric ratios, a stoichiometric polyelectrolyte complex, also referred to as stoichiometric PEC, may be formed. Unlike non-stoichiometric PECs, which are typically water-soluble, stoichiometric PECs typically show a low solubility in water.

The primer composition may further comprise a cosolvent. Cosolvents are further explained below.

In an embodiment, the aqueous primer comprises at least 2.5 wt % polyelectrolyte complex based on the total amount of aqueous primer composition.

Generally, aqueous compositions comprising a high amount of dispersed polymer are highly viscous. Compositions having a high viscosity are difficult to jet. It was surprisingly found, though, that solutions comprising a stoichiometric polyelectrolyte complex are less viscous than conventional polymer dispersions and therefore can be jetted effectively. Using primer compositions having a high concentration of polyelectrolyte complex is advantageous, because only a low volume of primer needs to be applied. This reduces the amount of water and optionally additional solvent that needs to be removed after application of the primer.

In an embodiment, the aqueous primer further comprises a salt.

The presence of salt may influence the solubility of the polyelectrolyte complex.

Preferably, the salt is selected from the group consisting of ammonium salts, quaternary ammonium salts, alkali salts, such as sodium salts, potassium salts and lithium salts; calcium salts, magnesium salts, barium salts, iron salts and cupper salts, nitrate salts, phosphate salts, sulfate salts, carbonate salts and nitrite salts. Preferably, the salt is highly soluble in the primer composition.

Preferably, the salt may not be one of a fluoride, chloride, bromide or iodide salt, if the primer composition is applied using an inkjet print head. These types of salt, comprising halogen anions, tend to corrode the print head. Therefore, the primer composition preferably has low content of, or is even free from, such anions.

The salt may preferably be present in an amount of from 5 wt % to 50 wt % based on the total amount of aqueous primer composition. Preferably, the salt may preferably be present in an amount of from 10 wt % to 40 wt % based on the total amount of aqueous primer composition, for example from 12 wt % to 30 wt % based on the total amount of aqueous primer composition. If the salt is present in an amount of less than 5 wt % based on the total amount of aqueous primer composition, the solubility of the stoichiometric polyelectrolyte complex may be insufficient and precipitation of the stoichiometric polyelectrolyte complex may take place in the print head, which is unwanted.

If the salt is present in an amount of more than 50 wt % based on the total amount of aqueous primer composition, the composition may become too viscous to be properly jetted using an inkjet print head.

Stoichiometric polyelectrolyte complexes may be well soluble in solutions comprising a salt, especially at higher salt concentrations. This property may be advantageously used when using solutions of stoichiometric polyelectrolyte complexes. The primer composition may be applied on the recording medium as a solution comprising salt. The stoichiometric polyelectrolyte complex may be dissolved in the primer. Upon drying of the fluid, the salt concentration may increase and the stoichiometric polyelectrolyte may stay dissolved. When ink is applied onto the recording medium provided with the primer, the dissolved stoichiometric polyelectrolyte complex may interact with the components of the ink, in particular the pigment and water-dispersible resin, and may destabilize these components, thereby increasing the print quality of the recorded image.

In summary, the solubility of the stoichiometric polyelectrolyte complex in solutions comprising salt allows to efficiently destabilize pigments and or water-dispersible resins, allowing creating good images.

In addition, low solubility of the stoichiometric polyelectrolyte complex may provide prints recorded using a primer comprising a stoichiometric polyelectrolyte complex with water fastness. If such print comes into contact with water, the stoichiometric polyelectrolyte complex may not dissolve.

In an embodiment, the amount of organic solvent in the primer is less than 10 wt % based on the total amount of aqueous primer composition.

Organic solvents may be disadvantageous from a health, safety and environmental point of view. A stable primer composition may be formed without the use of any organic solvent. Therefore, it is preferred that the amount of organic solvent in the primer is less than 10 wt % based on the total amount of aqueous primer composition.

In an embodiment, the aqueous ink comprises at least one of a water-dispersible resin and a water-dispersible colorant. Water-dispersible resins are further described below, as well as the water-dispersible colorant.

In an embodiment, the polyelectrolyte complex is a polydiallyldimethylammonium polystyrenesulfonate complex.

Polydiallyldimethylammonium polystyrenesulfonate complex is a complex comprising cationic polydiallyldimethylammonium polymer and anionic polystyrenesulfonate polymer that form a complex with one another. The polydiallyldimethylammonium polymer may have a molecular weight in the range of 1000 to 1000000 g/mole. The polystyrenesulfonate polymer may have a molecular weight in the range of 1000 to 1000000 g/mole.

A polydiallyldimethylammonium polystyrenesulfonate complex is suitable for use in a primer composition.

In an embodiment, the method further comprises:
c. Drying the recording medium.

Drying may be done in between applying an aqueous primer and applying the ink, or may be done after applying the ink. Alternatively, more than one drying step may be performed in the method. By drying the recording medium, water and optional solvents may be removed.

Drying may be done by applying heat to the recording medium and/or refreshing air around the recording medium. Applying heat may be done using a radiation heater, for example an IR heater. Alternatively and/or additionally the recording medium may be passed over a heated plate. Refreshing air around the recording medium may be done by blowing air over the recording medium. Optionally, the air may be at elevated temperature to increase the rate of evaporation of water and optional additional solvents.

Aqueous Ink Composition

An ink composition used in the ink in the present method is not particularly limited and can e.g. comprise a water-dispersible resin, a water-dispersible colorant, water, a co-solvent, a surfactant and optionally other additives. Preferably, the ink is water-based. In the ink, the amount of each component is not particularly limited as long as a printing ink is obtained.

Water-Dispersible Resin (Latex Resin)

Examples of the water-dispersible resin include synthetic resins and natural polymer compounds. Examples of the synthetic resins include polyester resins, polyurethane resins, polyepoxy resins, polyamide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymers such as styrene-acrylate copolymer resins, styrene-butadiene copolymer resins. Examples of the natural polymer compounds include celluloses, rosins, and natural rubbers.

The water-dispersible resin may be used in the form of a homopolymer, a copolymer or a composite resin, and all of water-dispersible resins having a monophase structure or core-shell structure and those prepared by power-feed emulsion polymerization may be used.

Water-Dispersible Colorant

A water-dispersible colorant may be a pigment or a mixture of pigments, a dye or a mixture of dyes or a mixture comprising pigments and dyes, as long as the colorant is water-dispersible. The pigment is not particularly limited and may be suitably selected in accordance with the intended use.

Examples of the pigment usable include those commonly known without any limitation, and either a water-dispersible pigment or an oil-dispersible pigment is usable. For example, an organic pigment such as an insoluble pigment or a lake pigment, as well as an inorganic pigment such as carbon black, is preferably usable.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination. As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Solvent

Water is cited as an environmentally friendly and hence desirable solvent.

Co-Solvent

As a co-solvent of the ink and/or the primer, for the purposes of improving the ejection property of the ink/primer or adjusting physical properties of the ink/primer, the ink/primer preferably contains a water soluble organic solvent in addition to water. As long as the effect of the present invention is not damaged, there is no restriction in particular in the type of the water soluble organic solvent. Also, more than one co-solvent can be used in the ink/primer used in the present invention.

Examples of the water-soluble organic solvent include polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

Examples of the solvent include: glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, pentaerythritol ethoxylate, polyethylene glycol (di)methylethers preferably having a molecular weight of between 200 gram/mol and 1000 gram/mol, tri-methylol-propane, diglycerol (diglycerin), trimethylglycine (betaine), N-methylmorpholine N-oxide, decaglycerol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol monoethyl ether, diethylene glycol mono-propyl ether, diethylene glycol mono-butyl ether, triethylene glycol monomethyl ether, triethylene glycol monoethyl ether, triethylene glycol mono-propyl ether, triethylene glycol mono-butyl ether, tetraethylene glycol monomethyl ether, tetraethylene glycol monoethyl ether, propylene glycol mono-butyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol-monoethyl ether acetate, 1,2-hexanediol, 1,2-pentanediol and 1,2-butanediol.

Surfactants

It is preferable that the ink contains at least one surfactant in order to improve an ink ejection property and/or the wettability of the surface of a recording medium, and the image density and color saturation of the image formed and reducing white spots therein. Using surfactants, the surface tension, i.e. the dynamic surface tension as well as the static surface tension, can be adjusted.

Examples of surfactants are not specifically limited. Examples of the surfactant include nonionic surfactants, cationic surfactants, anionic surfactants, amphoteric surfactants, in particular betaine surfactants, silicone surfactants, and fluoro-surfactants. These surfactants may be used solely, or they may be used in combination.

Additives

The ink composition may optionally further contain additives like biocides or a penetrant, which is a compound that promotes absorption of the ink composition in the print medium. The additives are not particularly limited and comprise those usually used in inks. Such additives may also be present in the primer composition.

Recording Medium

Suitable recording media for use in a printing process using an ink or set of inks (e.g. Cyan, Magenta, Yellow and blacK, CMYK) according to the present invention are not particularly limited to any type. Recording medium is also known as receiving medium or substrate. The receiving medium may be suitably selected depending on the intended application.

Suitable receiving media may range from strongly water absorbing media such as plain paper to non-water-absorbing media such as plastic sheets (for example PE, PP, PVC and PET films). To optimize print quality, inkjet coated media are known, which media comprise a highly water absorbing coating.

Of particular interest in the context of the present invention are Machine Coated (MC) media (also known as offset coated media) and glossy (coated) media, particularly MC media. MC media are designed for use in conventional printing processes, for example offset printing and show good absorption characteristics with respect to solvents used in inks used in such printing processes, which are usually organic solvents. MC and glossy media show inferior absorption behavior with respect to water (worse than plain paper, better than plastic sheets), and hence aqueous inks. Such media are known in the art.

In an aspect of the invention, a printing apparatus is provided, the printing apparatus comprising
 a. A primer application unit;
 b. An ink application unit, and;
 c. A control unit for controlling the printing apparatus to perform a method according to the present invention.

The printing apparatus is thus configured to perform a method according to the present invention.

Further aspects and embodiments of the invention are disclosed in the dependent claims and can be taken from the following description, figures and examples, without being limited thereto.

BRIEF DESCRIPTION OF THE DRAWINGS

The present invention will become more fully understood from the detailed description given herein below and accompanying schematical drawings which are given by way of illustration only and are not limitative of the invention, and wherein:

FIGS. 2A and 2B assembly of inkjet heads; FIG. 2C detailed view of a part of the assembly of inkjet heads.

In the drawings, same reference numerals refer to same elements.

DETAILED DESCRIPTION

An exemplary printing process in an ink-jet printing apparatus of the present invention will now be described with reference to the appended drawings shown in FIG. 1 and FIGS. 2A-2C. FIGS. 1 and 2A-2C show schematic representations of an inkjet printing system and an inkjet marking device, respectively. However, the present ink-jet printing process and ink-jet printing apparatus are not limited to this exemplary embodiment.

Figure 1:
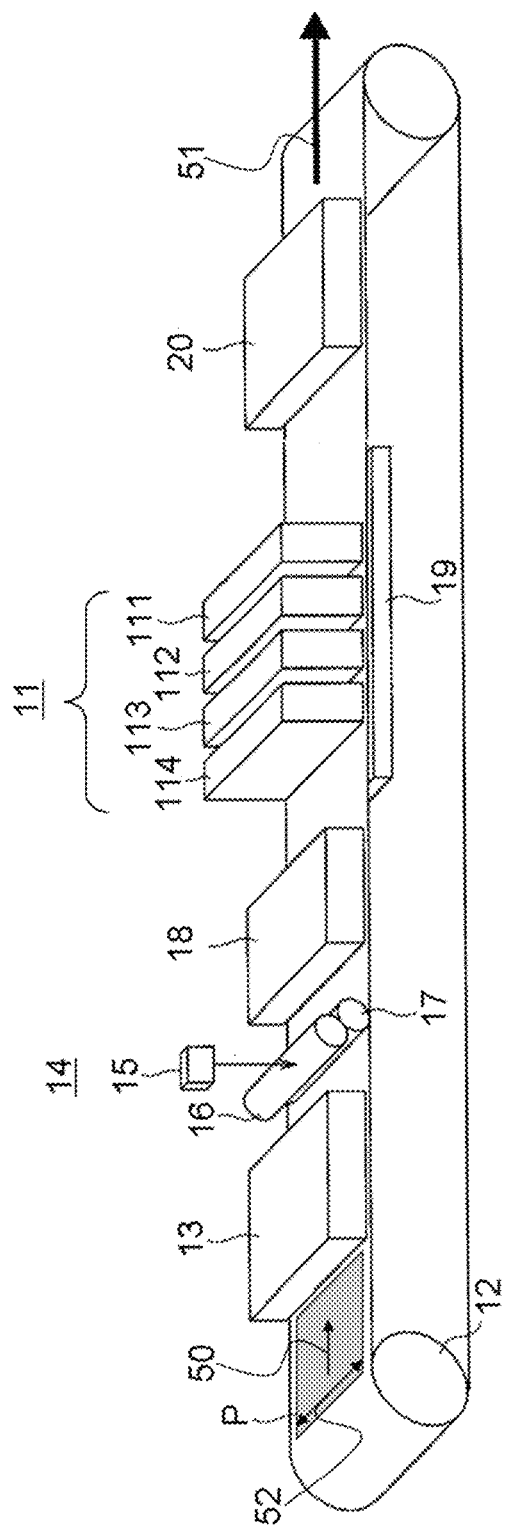
FIG. 1 shows a schematic representation of an inkjet printing system.

FIG. 1 shows that a sheet of a recording medium, in particular a machine coated medium, P, is transported in a direction for conveyance as indicated by arrows 50 and 51 and with the aid of transportation mechanism 12. Transportation mechanism 12 may be a driven belt system comprising one (as shown in FIG. 1) or more belts. Alternatively, one or more of these belts may be exchanged for one or more drums. A transportation mechanism may be suitably configured depending on the requirements (e.g. sheet registration accuracy) of the sheet transportation in each step of the printing process and may hence comprise one or more driven belts and/or one or more drums. For a proper conveyance of the sheets of receiving medium, the sheets need to be fixed to the transportation mechanism. The way of fixation is not particularly limited and may be selected from electrostatic fixation, mechanical fixation (e.g. clamping) and vacuum fixation. Of these vacuum fixation is preferred.

The printing process as described below comprises the following steps: media pre-treatment, image formation, drying and fixing and optionally post treatment.

Media Pre-Treatment

To improve the spreading and pinning (i.e. fixation of pigments and water-dispersed polymer particles) of the ink on the recording medium, in particular on slow absorbing media, such as machine coated media, the recording medium is pre-treated, i.e. treated prior to printing an image on the medium. The pre-treatment step comprises the application of the pre-treatment liquid of the present invention and may further comprise one or more of the following:

preheating of the receiving medium to enhance spreading of the used ink on the receiving medium and/or to enhance absorption of the used ink into the receiving medium;

corona or plasma treatment.

Primer Pre-Treatment

As an application way of the pre-treatment liquid, any conventionally known method can be used. Specific examples of an application way include: a roller coating, an ink-jet application, a curtain coating and a spray coating. There is no specific restriction in the number of times with which the pre-treatment liquid is applied. It may be applied at one time, or it may be applied in two times or more. Application in two times or more may be preferable, since cockling of the coated printing paper can be prevented and the film formed by the surface pre-treatment liquid will produce a uniform dry surface having no wrinkle by applying in 2 steps or more.

Especially a roller coating (see 14 in FIG. 1) method is preferable because this coating method does not need to take into consideration ejection properties and it can apply the pre-treatment liquid homogeneously to a recording medium. In addition, the amount of the applied pre-treatment liquid with a roller or with other means to a recording medium can be suitably adjusted by controlling: the physical properties of the pre-treatment liquid; and the contact pressure of a roller in a roller coater to the recording medium and the rotational speed of a roller in a roller coater which is used for a coater of the pre-treatment liquid. As an application area of the pre-treatment liquid, it may be possible to apply only to the printed portion, or to the entire surface of both the printed portion and the non-printed portion. However, when the pre-treatment liquid is applied only to the printed portion, unevenness may occur between the application area and a non-application area caused by swelling of cellulose contained in the coated printing paper with the water in the pre-treatment liquid followed by drying. Then, from the viewpoint of drying uniformly, it is preferable to apply the pre-treatment liquid to the entire surface of a coated printing paper, and roller coating can be preferably used as a coating method to the whole surface. The pre-treatment liquid may be an aqueous pre-treatment liquid.

Corona or Plasma Treatment

Corona or plasma treatment may be used as a pre-treatment step by exposing a sheet of a recording medium to corona discharge or plasma treatment. In particular when used on media like polyethylene (PE) films, polypropylene (PP) films, polyetyleneterephtalate (PET) films and machine coated media, the adhesion and spreading of the ink can be improved by increasing the surface energy of the media. With machine coated media, the absorption of water can be promoted which may induce faster fixation of the image and less puddling on the receiving medium. Surface properties of the receiving medium may be tuned by using different gases or gas mixtures as medium in the corona or plasma treatment. Examples are air, oxygen, nitrogen, carbondioxide, methane, fluorine gas, argon, neon and mixtures thereof. Corona treatment in air is most preferred.

FIG. 1 shows that the sheet of receiving medium P may be conveyed to and passed through a first pre-treatment module 13, which module may comprise a preheater, for example a radiation heater, a corona/plasma treatment unit, a gaseous acid treatment unit or a combination of any of the above. Subsequently, a predetermined quantity of the present pre-treatment liquid is applied on the surface of the receiving medium P at pre-treatment liquid applying member 14. Specifically, the pre-treatment liquid is provided from storage tank 15 of the pre-treatment liquid to the pre-treatment liquid applying member 14 composed of double rolls 16 and 17. Each surface of the double rolls may be covered with a porous resin material such as sponge. After providing the pre-treatment liquid to auxiliary roll 16 first, the pre-treatment liquid is transferred to main roll 17, and a predetermined quantity is applied on the surface of the recording medium P. Alternatively, the pre-treatment liquid can also be applied by one or more print heads. Subsequently, the coated printing paper P on which the pre-treatment liquid was supplied may optionally be heated and dried by drying member 18 which is composed of a drying heater installed at the downstream position of the pre-treatment liquid applying member 14 in order to decrease the quantity of the water content in the pre-treatment liquid to a predetermined range.

To prevent the transportation mechanism 12 being contaminated with pre-treatment liquid, a cleaning unit (not shown) may be installed and/or the transportation mechanism may be comprised of multiple belts or drums as described above. The latter measure prevents contamination of the upstream parts of the transportation mechanism, in particular of the transportation mechanism in the printing region.

Image Formation

Image formation is performed in such a manner that, employing an inkjet printer loaded with inkjet inks, ink droplets are ejected from the inkjet heads based on the digital signals onto a print medium.

Although both single pass inkjet printing and multi pass (i.e. scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a recording medium underneath an inkjet marking module.

In FIG. 1, 11 represents an inkjet marking module comprising four inkjet marking devices, indicated with 111, 112, 113 and 114, each arranged to eject an ink of a different color (e.g. Cyan, Magenta, Yellow and blacK). The nozzle pitch of each head is e.g. about 360 dpi. In the present invention, "dpi" indicates a dot number per 2.54 cm.

Figure 2A:
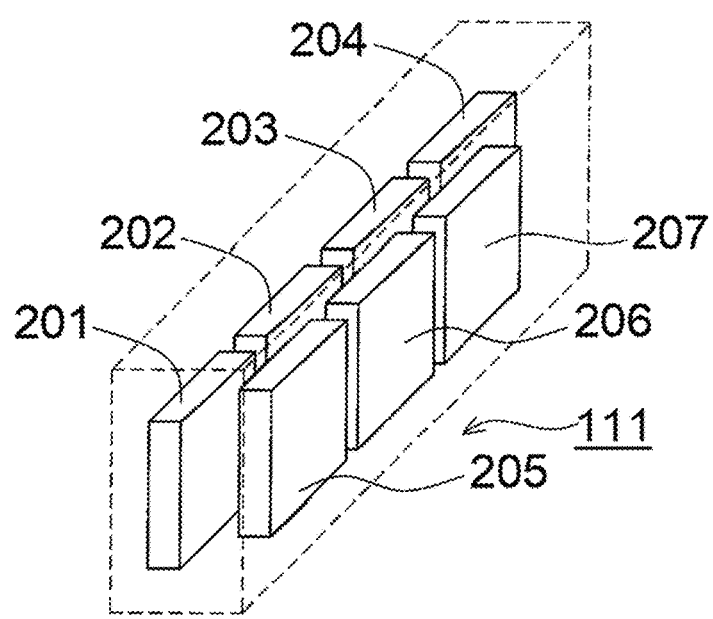
FIGS. 2A-2C show schematic representations of an inkjet marking device.
Figure 2B:
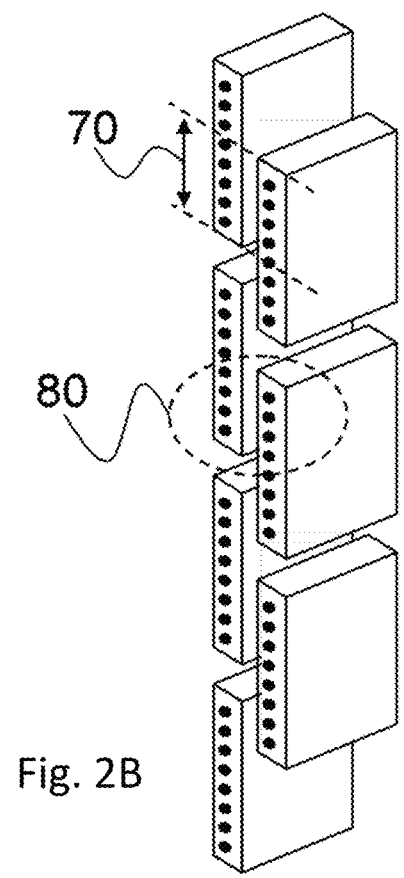
Figure 2C:
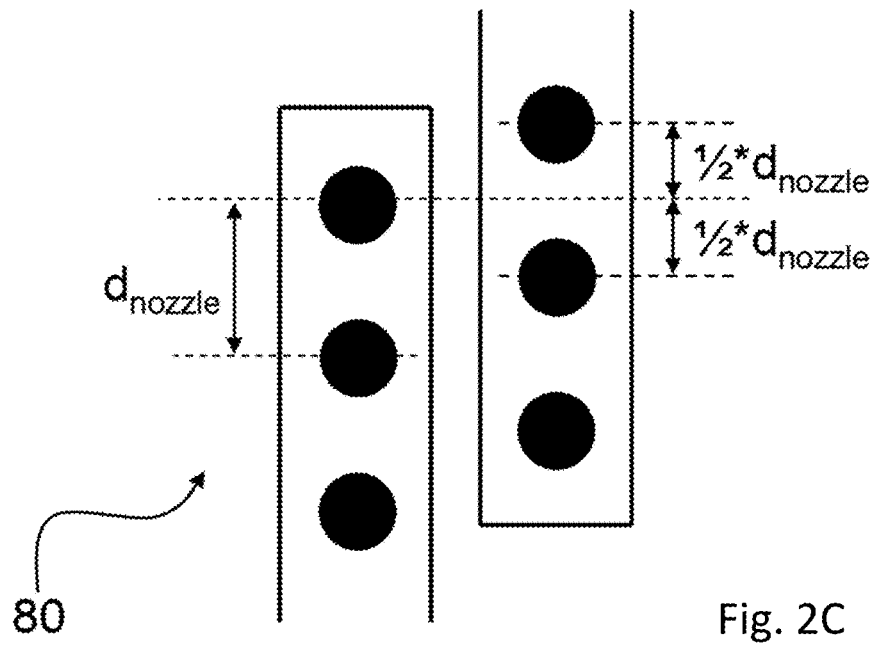

An inkjet marking device for use in single pass inkjet printing, 111, 112, 113, 114, has a length, L, of at least the width of the desired printing range, indicated with double arrow 52, the printing range being perpendicular to the media transport direction, indicated with arrows 50 and 51. The inkjet marking device may comprise a single printhead having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of printheads. FIG. 2A shows an inkjet marking device 111 (112, 113, 114 may be identical) comprising 7 individual inkjet heads (201, 202, 203, 204, 205, 206, 207) which are arranged in two parallel rows, a first row comprising four inkjet heads (201-204) and a second row comprising three inkjet heads (205-207) which are arranged in a staggered configuration with respect to the inkjet heads of the first row. The staggered arrangement provides a page wide array of nozzles which are substantially equidistant in the length direction of the inkjet marking device. The staggered configuration may also provide a redundancy of nozzles in the area where the inkjet heads of the first row and the second row overlap, see 70 in FIG. 2B. Staggering may further be used to decrease the nozzle pitch (hence increasing the print resolution) in the length direction of the inkjet marking device, e.g. by arranging the second row of inkjet heads such that the positions of the nozzles of the inkjet heads of the second row are shifted in the length direction of the inkjet marking device by half the nozzle pitch, the nozzle pitch being the distance between adjacent nozzles in an inkjet head, $d_{nozzle}$ (see FIG. 2C, which represents a detailed view of 80 in FIG. 2B). The resolution may be further increased by using more rows of inkjet heads, each of which are arranged such that the positions of the nozzles of each row are shifted in the length direction with respect to the positions of the nozzles of all other rows.

In image formation by ejecting an ink, an inkjet head (i.e. printhead) employed may be either an on-demand type or a continuous type inkjet head. As an ink ejection system, there may be usable either the electric-mechanical conversion system (e.g., a single-cavity type, a double-cavity type, a bender type, a piston type, a shear mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 μm or less in the current image forming method.

FIG. 1 shows that after pre-treatment, the receiving medium P is conveyed to upstream part of the inkjet marking module 11. Then, image formation is carried out by each color ink ejecting from each inkjet marking device 111, 112, 113 and 114 arranged so that the whole width of the receiving medium P is covered.

Optionally, the image formation may be carried out while the recording medium is temperature controlled. For this purpose a temperature control device 19 may be arranged to control the temperature of the surface of the transportation mechanism (e.g. belt or drum) underneath the inkjet marking module 11. The temperature control device 19 may be used to control the surface temperature of the recording medium P, for example in the range of 30° C. to 60° C. The temperature control device 19 may comprise heaters, such as radiation heaters, and a cooling means, for example a cold blast, in order to control the surface temperature of the receiving medium within said range. Subsequently and while printing, the receiving medium P is conveyed to the down stream part of the inkjet marking module 11.

Drying and Fixing

After an image has been formed on the receiving medium, the prints have to be dried and the image has to be fixed onto the receiving medium. Drying comprises the evaporation of solvents, in particular those solvents that have poor absorption characteristics with respect to the selected recording medium.

FIG. 1 schematically shows a drying and fixing unit 20, which may comprise a heater, for example a radiation heater. After an image has been formed, the print is conveyed to and passed through the drying and fixing unit 20. The print is heated such that solvents present in the printed image, to a large extent water, evaporate. The speed of evaporation and hence drying may be enhanced by increasing the air refresh rate in the drying and fixing unit 20. Simultaneously, film formation of the ink occurs, because the prints are heated to a temperature above the minimum film formation temperature (MFT). The residence time of the print in the drying and fixing unit 20 and the temperature at which the drying and fixing unit 20 operates are optimized, such that when the print leaves the drying and fixing unit 20 a dry and robust print has been obtained. As described above, the transportation mechanism 12 in the fixing and drying unit 20 may be separated from the transportation mechanism of the pre-treatment and printing section of the printing apparatus and may comprise a belt or a drum.

Hitherto, the printing process was described such that the image formation step was performed in-line with the pre-treatment step (at least application of an (aqueous) pre-treatment liquid) and a drying and fixing step, all performed by the same apparatus (see FIG. 1). However, the printing process is not restricted to the above-mentioned embodiment. A method in which two or more machines are connected through a belt conveyor, drum conveyor or a roller, and the step of applying a pre-treatment liquid, the (optional) step of drying a coating solution, the step of ejecting an inkjet ink to form an image, and the step or drying an fixing the printed image are performed. It is, however, preferable to carry out image formation with the above defined in-line image forming method.

In a further aspect, the present invention relates to a method of pre-treating a recording medium comprising pre-treating a recording medium with the pre-treatment liquid of the invention, e.g. as described with regard to the printing process.

EXPERIMENTS AND EXAMPLES

Materials

Poly(4-styrenesulphonic acid, sodium salt) was obtained from Polysciences as a 70 kDa solution 30% in water with viscosity of 200 mPas. FL4440, a commercially available poly-(diallyldimethylammoniumchloride), was obtained from SNF-Floerger. Magnesium nitrate was obtained from Sigma-Aldrich. All chemicals were used as received. All salt solutions were prepared using deionized water.

Canon Yellow Label Standard 2-Gts 80 gr A4 297×210 mm from Canon was used as uncoated recording medium. UPM Finesse Matt from UPM was used as coated recording medium.

Methods

Stoichiometric Polyelectrolyte Complex

A stoichiometric polyelectrolyte complex was prepared according to the method disclosed in Wang et al. (*Macro-* molecules 2014, 47, 3109). The resulting polyelectrolyte complex is further referred to as complex 1.

Rodcoats

Rodcoats were prepared by applying a layer having a thickness of 4 μm of COMP 1 (see below) in an area of 5×10 cm on the coated recording medium. Further, a layer of having a thickness of 4 μm of Varioprint i-series MO6 Cyan ink was applied. The layer of COMP 1 and the layer of ink partially overlap. After application of COMP 1 and ink, the rodcoat was dried in an oven at 120° C. for 15 minutes, resulting in rodcoat 1. Rodcoat 2 was prepared using a similar method, but uncoated recording medium was used instead of coated recording medium.

Waterfastness

Waterfastness was determined by exposing a rodcoat to running tapwater. After exposure, the rodcoat was visually inspected and it was checked whether the color of the rodcoat was faded or not. Fading of the color is an indication of lack of waterfastness.

Dilution Series

A solution of complex 1 and magnesium nitrate in water was prepared by adding 7.2 gram of complex 1 and 37.1 grams of magnesium nitrate to 100 grams of water and stirring. The resulting solution is referred to as composition 1 (COMP 1).

To make the dilution series, varying amounts of deionized water were added to quantities of COMP 1. The occurrence of phase separation was observed visually.

Compositions COMP 2a-COMP 2g were prepared by providing the components shown in table 1 in the amount shown in table 1 and mixing the components.

The first ink composition is ink composition Ex 1, which is an ink composition according to the present invention.

The second ink composition is ink composition CE 1, which is an ink composition not according to the present invention. The third ink composition is ink composition CE 2, which is also an ink composition not according to the present invention.

ink is applied in a vertical direction in area 110. No ink was applied in areas 111. The areas where primer was applied partially overlap with areas ink was applied.

Figures 3A, 3B:
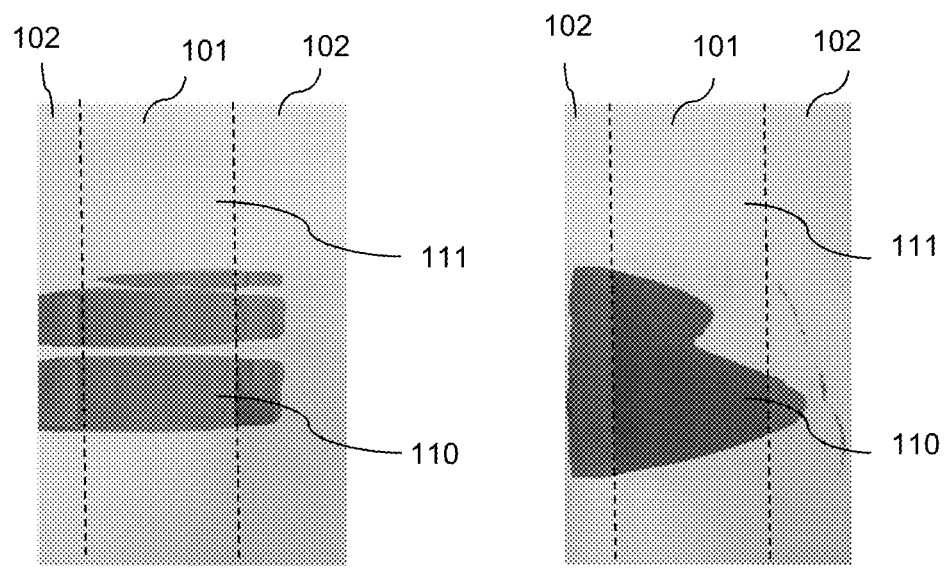
FIGS. 3A-3B show two rodcoats.

In FIG. 3B, it was observed that the color appearance was more intense in those parts of the sample where inked area 110 overlapped with primer area 101 compared to parts where the inked area 110 overlapped with the non-primed area 102. From this observation, it is concluded that COMP 1 is suitable to use as a primer composition.

Further, the waterfastness of rodcoat 2 was determined. Upon exposure of rodcoat 2 to running tab water, it was observed that the color in those parts of the sample where inked area 110 overlapped with primer area 101 did not fade. From this observation, it is concluded that a primer in accordance with the preset invention is suited to prepare images on a recording medium showing waterfastness.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

TABLE 1

| Samples | COMP 2a | COMP 2b | COMP 2c | COMP 2d | COMP 2e | COMP 2f | COMP 2g |
|---|---|---|---|---|---|---|---|
| COMP 1 (g) | 1.00 | 1.25 | 1.50 | 1.75 | 2.00 | 2.25 | 2.50 |
| water (g) | 2.50 | 2.25 | 2.00 | 1.75 | 1.50 | 1.25 | 1.00 |
| wt % Mg(NO$_3$)$_2$ | 7.3 | 9.2 | 11.0 | 12.9 | 14.7 | 16.5 | 18.4 |
| Single phasic stable regime | no | no | no | lyes | yes | yes | yes |

It is observed that at higher salt concentrations, a single stable phase is formed and no phase separation is observed. At lower salt concentrations, i.e. salt concentrations lower than 12 wt % based on the total weight of the composition, no stable single phase is observed in the above experiment and phase separation occurs.

It is noted that the occurrence of phase separation depends not only on the concentration of salt, but also on the concentration of the polyelectrolyte complex. The lower the amount of polyelectrolyte complex, the lower the minimum salt concentration to maintain a stable, single phase.

Rodcoats Comparison

Rodcoat 1 and rodcoat 2 are shown in FIG. 3. Rodcoat 1 is the rodcoat shown in FIG. 3A, rodcoat 2 is the rodcoat shown in FIG. 3B.

The primer is applied in a horizontal direction; the borders of the area where primer is applied 101 is indicated in FIG. 3 by dotted lines. In areas 102, no primer was applied. The

The invention claimed is:

1. A method for applying an image onto a recording medium, the method comprising the steps of:
    applying an aqueous primer onto the recording medium, the aqueous primer comprising a stoichiometric polyelectrolyte complex, wherein the stoichiometric polyelectrolyte complex comprises polyanions and polycations in a stoichiometric ratio; and
    applying an aqueous ink onto the recording medium provided with the primer.

2. The method according to claim 1, wherein the aqueous primer comprises at least 2.5 wt % polyelectrolyte complex based on the total amount of aqueous primer composition.

3. The method according to claim 1, wherein the aqueous primer further comprises a salt.

4. The method according to claim 1, wherein the amount of organic solvent in the primer is less than 10 wt % based on the total amount of aqueous primer composition.

5. The method according to claim 1, wherein the aqueous ink comprises at least one of a water dispersible resin and a water-dispersible colorant.

6. The method according to claim 1, wherein the polyelectrolyte complex is a polydiallyldimethylammonium polystyrenesulfonate complex.

7. The method according to claim 1, wherein the method further comprises:
    drying the recording medium.

8. A printing apparatus comprising
    a primer application unit;
    an ink application unit, and;
    a control unit for controlling the printing apparatus to perform a method according to claim 1.

* * * * *